(12) United States Patent
Chen

(10) Patent No.: US 7,082,000 B2
(45) Date of Patent: Jul. 25, 2006

(54) ASPHERICAL LENS WITH GRATING

(75) Inventor: Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/862,949

(22) Filed: Jun. 7, 2004

(65) Prior Publication Data

US 2004/0246594 A1    Dec. 9, 2004

(30) Foreign Application Priority Data

Jun. 6, 2003    (TW) ............................. 92210420 U

(51) Int. Cl.
  *G02B 13/18*    (2006.01)
  *G11B 7/00*    (2006.01)
(52) U.S. Cl. .................. 359/708; 359/719; 359/721; 369/112.26
(58) Field of Classification Search ............... 359/719, 359/721, 722, 724, 708; 369/112.26, 112.13, 369/112.08, 44.14
See application file for complete search history.

(56) References Cited

U.S. PATENT DOCUMENTS

| 5,513,045 A |   | 4/1996 | Ito |
| 5,557,472 A |   | 9/1996 | Ito |
| 5,861,999 A |   | 1/1999 | Tada |
| 6,344,935 B1 | * | 2/2002 | Maruyama .................. 359/722 |
| 6,493,143 B1 | * | 12/2002 | Kato .......................... 359/566 |

FOREIGN PATENT DOCUMENTS

JP    2002-277732    *    9/2002

* cited by examiner

*Primary Examiner*—Timothy Thompson
(74) *Attorney, Agent, or Firm*—Wei Te Chung

(57) ABSTRACT

An aspherical lens (10, 10') has an aspherical surface (101, 101') and an opposite flat surface (102, 102'). A multiple-step grating is defined in the flat surface by a photolithographic method. The aspherical lens has a reduced chromatic aberration effect, and can thus provide a clear image. Furthermore, an effect of the aspherical lens having the grating is equivalent to that of a conventional aspherical lens unit. Thus, when the aspherical lens is used in an optical system, it can reduce a bulk and a weight of the optical system.

18 Claims, 4 Drawing Sheets

US 7,082,000 B2

ASPHERICAL LENS WITH GRATING

BACKGROUND OF THE INVENTION

1. Field of the Invention

This invention relates generally to optical components such as those used in consumer products; and more particularly to aspherical lenses.

2. Description of the Related Art

Aspherical lenses are widely used in aspherical lens systems of vidicons, cameras and so on. U.S. Pat. No. 5,861,999 discloses a conventional aspherical lens system. The aspherical lens system comprises a plurality of aspherical lens units. Each aspherical lens unit comprises two aspherical lenses with a clearance defined therebetween. A chromatic aberration of the aspherical lens unit can be adjusted by adjusting the clearance. U.S. Pat. Nos. 5,557,472 and 5,513,045 also disclose such conventional aspherical lens systems.

Optical characteristics of each aspherical lens unit are determined in large part by the physical geometry of each of the aspherical lenses thereof. If either aspherical lens is imprecisely formed, this can result in an unacceptably high chromatic aberration effect. Furthermore, the aspherical lens system comprising a plurality of aspherical lens units is relatively bulky and heavy, and unsuited for miniaturized applications.

Therefore, a new kind of aspherical lens that overcomes the above-described problems is desired.

BRIEF SUMMARY OF THE INVENTION

Accordingly, an object of the present invention is to provide an aspherical lens having an ameliorated chromatic aberration effect.

Another object of the present invention is to provide an aspherical lens that can be used in an aspherical lens system so as to reduce a bulk and a weight of the aspherical lens system.

To achieve the above-mentioned objects, the present invention provides an aspherical lens having an aspherical surface and an opposite flat surface with a multiple-step grating defined therein.

The aspherical lens of the present invention can reduce a chromatic aberration effect thereof by adjusting phases thereof by using the grating. Thus, the aspherical lens can provide a clear image. Furthermore, an effect of the aspherical lens having the grating is equivalent to that of a conventional aspherical lens unit. Thus, when the aspherical lens having the grating is used in an aspherical lens system, it can reduce a bulk and a weight of the aspherical lens system.

Other objects, advantages and novel features of the invention will become more apparent from the following detailed description when taken in conjunction with the accompanying drawings, in which:

DESCRIPTION OF THE PREFERRED EMBODIMENTS

Figure 13:
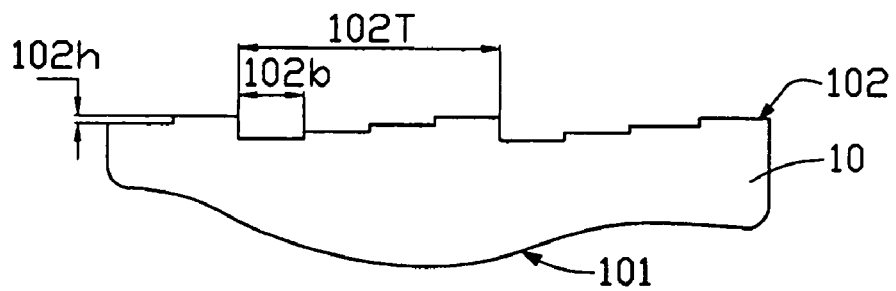
FIG. 13 is similar to FIG. 12, but showing the completed aspherical lens in accordance with the first embodiment of the present invention after residual portions of the second photo resist film have been removed.

Referring to FIG. 13, a first embodiment of an aspherical lens of the present invention is shown. The aspherical lens 10 has an aspherical surface 101 and an opposite flat surface 102. A multiple-step grating (not labeled) is defined in the flat surface 102. The grating has a plurality of nonsymmetrical steps (not labeled). In particular, the grating has "n" sections of uniform lengths (102T shown in FIG. 13). A plurality of nonsymmetrical steps is defined along each uniform length 102T. A height of each step is 102h, and a width of each step is 102b. The height 102h can be less than 100 nanometers.

FIGS. 1 to 13 show a method for fabricating the aspherical lens 10. The method comprises the following steps:

(a) providing an aspherical lens 10; and (b) defining a multiple-step grating in the aspherical lens 10.

Figure 1:
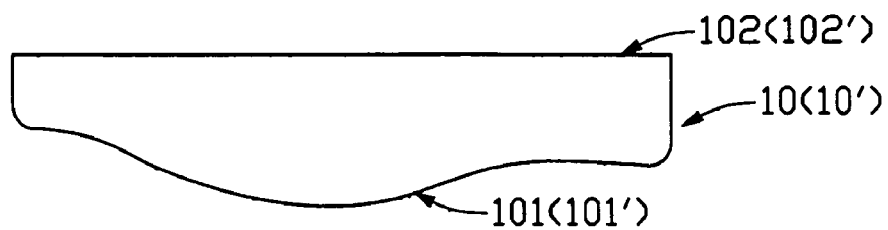
FIG. 1 is a schematic side elevation of an aspherical lens in accordance with the present invention, but prior to formation of a grating therein.
Figure 2:
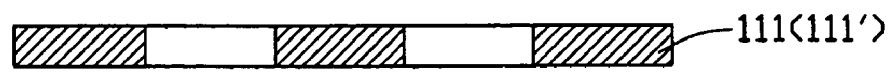
FIG. 2 is a schematic side cross-sectional view of a first mask used in a first optical lithograph process for fabricating the aspherical lens of the present invention.

Referring to FIG. 1, a schematic side elevation of the aspherical lens 10 in accordance with step (a) of the method of the present invention is shown. The aspherical lens 10 has an aspherical surface 101 and an opposite flat surface 102. The flat surface 102 is formed by a mechanical polishing process or a chemical polishing process.

Figure 3:
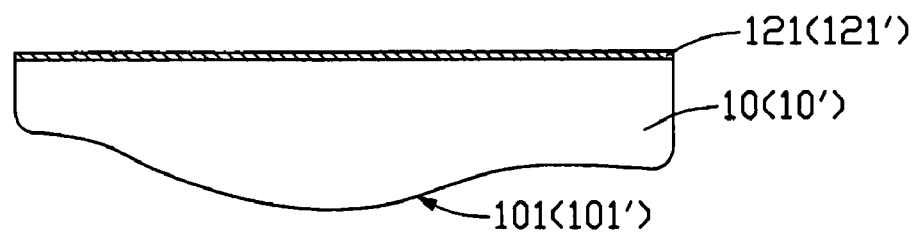
FIG. 3 is similar to FIG. 1, but showing a first photoresist film formed on the aspherical lens.

FIGS. 2 to 13 show successive stages of step (b). Firstly, a first photoresist film 121 is formed on the flat surface 102, as shown in FIG. 3. In the illustrated embodiment, the first photoresist film 121 can be a positive photoresist film. Alternatively, the first photoresist film 121 can be a negative photoresist film. Secondly, a first mask 111 (shown in FIG. 2) is placed on the first photoresist film 121. A size of the first mask 111 is the same as that of the flat surface 102, and a resolution of the first mask 111 is 100 lines/mm. Furthermore, the first mask 111 is produced by a chemical etching method. A total area of exposure portions of the first mask 111 is half of a total area of the first mask 111.

Figure 4:
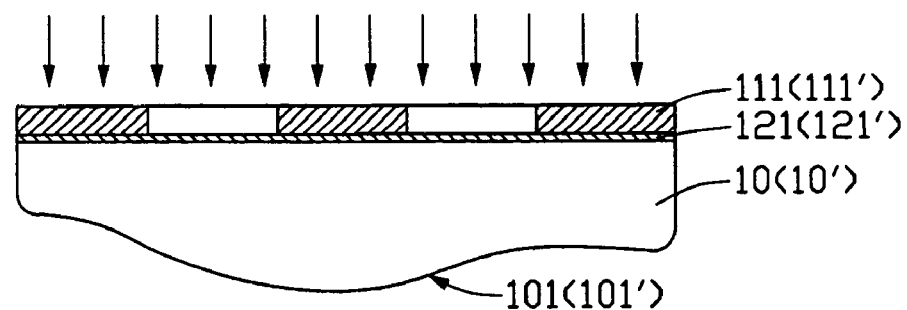
FIG. 4 is similar to FIG. 3, but showing the first mask placed on the first photoresist film and a first exposure process being performed.

Thirdly, a grating with a step is formed in the flat surface 102 by first exposure, developing and etching processes. FIG. 4 is a schematic cross-sectional view showing a first exposure process being performed on the aspherical lens 10 having the first mask 111 placed thereon. The first mask 111 is placed on the first photoresist film 121, and preferably an ultraviolet radiation exposure process is executed by an aligner or a stepper. Alternatively, an exposure process can be executed by an electron beam writer.

Figure 5:
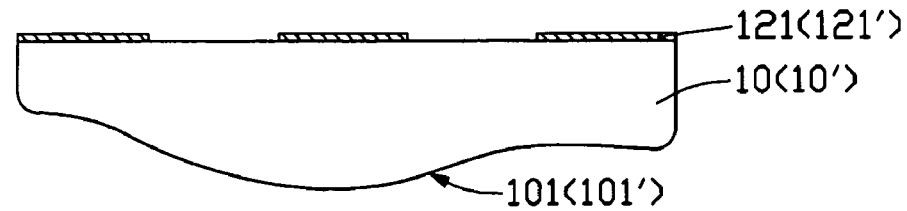
FIG. 5 is similar to FIG. 4, but showing the first photoresist film changed after a first developing process has been performed.

Then the photoresist portions of the first photoresist film 121 corresponding to the exposed areas are developed (see FIG. 5). The first photoresist film 121 is immersed in a developer. Because the first photoresist film 121 is a positive photoresist film, the portions of the first photoresist film 121 that have been exposed are dissolved. Alternatively, if the first photoresist film 121 is a negative photoresist film, the portions of the first photoresist film 121 that have not been exposed are dissolved.

Figure 6:
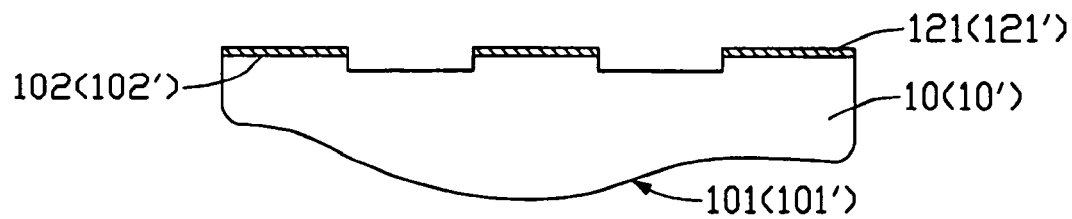
FIG. 6 is similar to FIG. 5, but showing the aspherical lens changed after a first etching process has been performed.

FIG. 6 shows the aspherical lens 10 after a first etching process has been performed. The first etching process is executed by using a photo etching technology or a μ-ray developing technology. The first etching process is controlled by a computer, so that it is performed only on those portions of the flat surface 102 that have been developed. Thus, a plurality of recesses is produced, with a depth of the recesses being determined by the steps desired in the fully completed grating.

Figure 7:
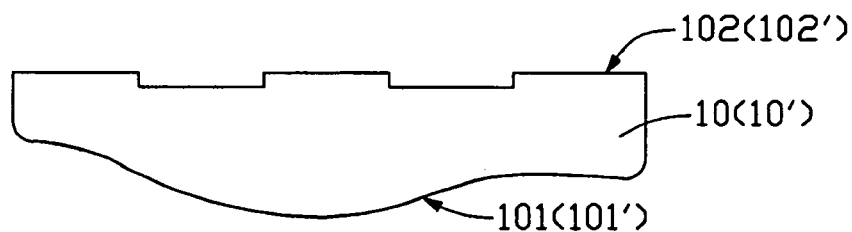
FIG. 7 is similar to FIG. 6, but showing the aspherical lens after residual portions of the first photoresist film have been removed.

Referring to FIG. 7, the residual portions of the first photo resist film 121 are removed by eroding the flat surface 102 using a potassium cyanide solution, or by using another suitable technique. Thus, a precursor grating with a set of double steps is formed on the flat surface 102.

Figure 8:
FIG. 8 is a schematic side cross-sectional view of a second mask used in a second optical lithography process for fabricating a first embodiment of the aspherical lens of the present invention.
Figure 9:
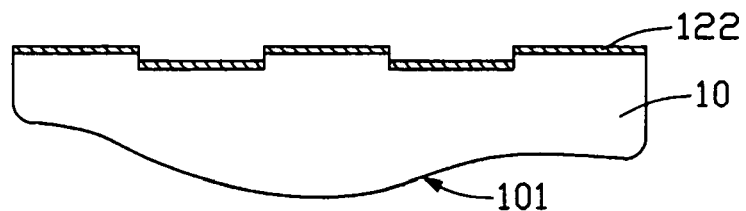
FIG. 9 is similar to FIG. 7, but showing a second photo resist film formed on the aspherical lens.
Figure 10:
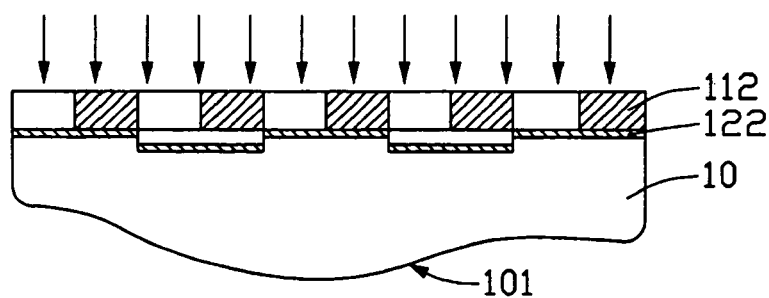
FIG. 10 is similar to FIG. 9, but showing the second mask placed on the second photoresist film and a second exposure process being performed.
Figure 11:
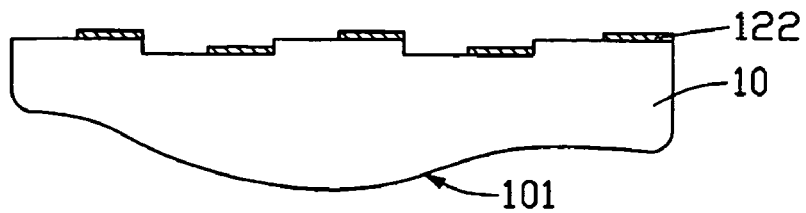
FIG. 11 is similar to FIG. 10, but showing the second photoresist film changed after a second developing process has been performed.
Figure 12:
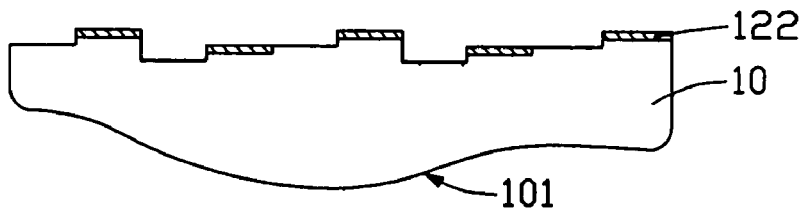
FIG. 12 is similar to FIG. 11, but showing the aspherical lens changed after a second etching process has been performed.

Referring to FIG. 8, a second mask 112 used for producing a multi-step grating is shown. A resolution of the second mask 112 is 200 lines/mm. Referring to FIGS. 9–12, a second photo resist film 122 is formed on the flat surface 102 of the aspherical lens 10, and the second mask 112 is placed on the second photo resist film 122. Second exposure, developing and etching processes are respectively performed, in similar fashion to the first exposure, developing and etching processes described above. A depth of recesses produced by the second etching process is half that of the recesses produced by the first etching process. Finally, residual portions of the second photo resist film 122 are removed by eroding the flat surface 102 using a potassium cyanide solution, or by using another suitable technique.

Thus, the aspherical lens 10 having the grating with the plurality of nonsymmetrical steps formed thereat is obtained.

By essentially repeating the above-described steps "n" times, each time using a mask having a resolution of $(2^n)*(R)$ (R denoting a resolution of the first mask 111, and n being a positive integer), and by controlling a depth of the recesses produced in each etching process to be half that of the recesses produced in the respective immediately preceding etching process, a $2^{n+1}$-step grating can be formed.

Figure 19:
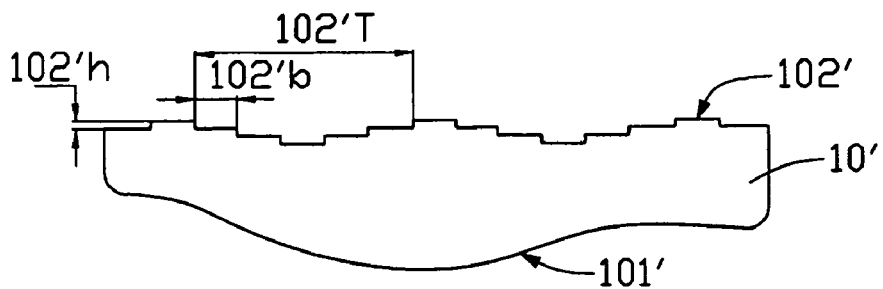
FIG. 19 is similar to FIG. 18, but showing the completed aspherical lens in accordance with the second embodiment of the present invention after residual portions of the third photoresist film have been removed.

Referring to FIG. 19, a second embodiment of the aspherical lens of the present invention is shown. The aspherical lens 10' has an aspherical surface 101' and an opposite flat surface 102'. A multiple-step grating (not labeled) is defined in the flat surface 102'. The grating has a plurality of symmetrical steps (not labeled). In particular, the grating has "n" sections of uniform lengths (102T shown in FIG. 13). A plurality of symmetrical steps is defined along each uniform length 102T. A height of each step is 102h, and a width of each step is 102b. The height 102h can be less than 100 nanometers.

A method for fabricating the aspherical lens 10' is as follows. Referring to FIGS. 1–7, according to the first embodiment, a grating with a set of double steps is formed on the flat surface 102'.

Figure 14:
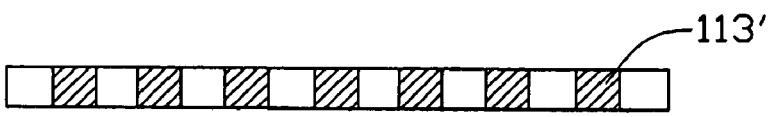
FIG. 14 is a schematic side elevation of a third mask used in a second optical lithograph process for fabricating a second embodiment of the aspherical lens of the present invention.
Figure 15:
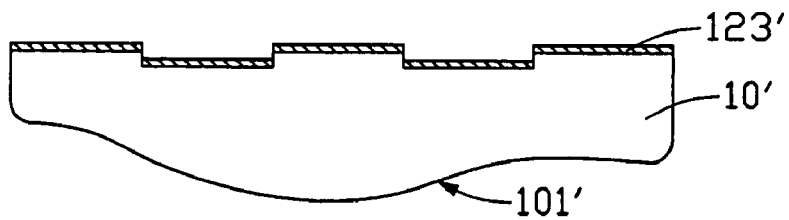
FIG. 15 is similar to FIG. 9, except that the photo resist film formed on the aspherical lens is defined as a third photo resist film.
Figure 16:
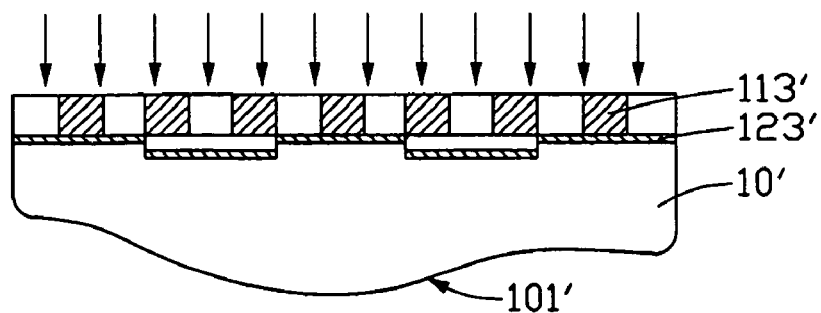
FIG. 16 is similar to FIG. 15, but showing the third mask placed on the third photoresist film and a second exposure process being performed.
Figure 17:
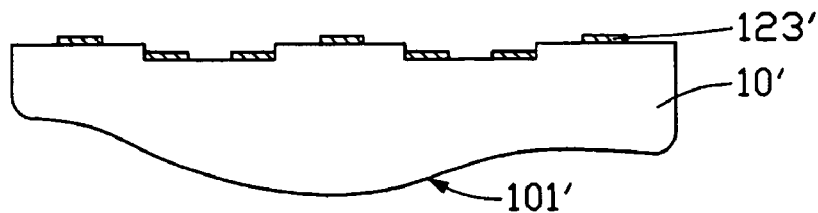
FIG. 17 is similar to FIG. 16, but showing the third photoresist film changed after a second developing process has been performed.
Figure 18:
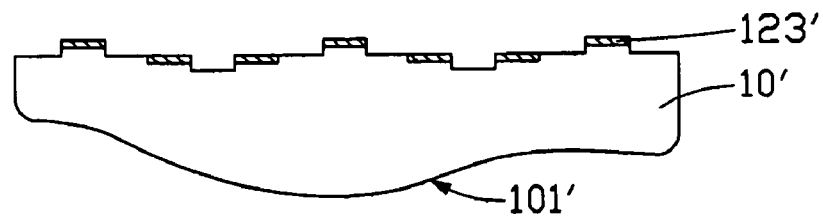
FIG. 18 is similar to FIG. 17, but showing the aspherical lens changed after a second etching process has been performed.

Referring to FIG. 14, a third mask 113' used for producing a multi-step grating is shown. A resolution of the third mask 113' is 300 lines/mm. Referring to FIGS. 15–18, a third photo resist film 123' is formed on the flat surface 102' of the aspherical lens 10', and second exposure, developing and etching processes are respectively performed. A depth of recesses produced in the second etching process is half that of the recesses produced in the first etching process. Finally, residual portions of the third photo resist film 123' are removed by eroding the flat surface 102' using a potassium cyanide solution, or by using another suitable technique. Thus, the aspherical lens 10' having the grating with the plurality of symmetrical steps formed thereat is obtained.

It is understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. An aspherical lens comprising a first aspherical surface, an opposite second substantially flat surface, and a grating defined in the second surface; wherein the grating has "n" sections of uniform length, and a stepped structure comprising a plurality of steps is defined along each section.

2. The aspherical lens as claimed in claim 1, wherein the grating is formed by means of photolithography.

3. The aspherical lens as claimed in claim 1, wherein the steps defined along each section are symmetrical.

4. The aspherical lens as claimed in claim 1, wherein the steps have a same width.

5. The aspherical lens as claimed in claim 1, wherein the steps have a same height.

6. The aspherical lens as claimed in claim 1, wherein a height of each step is less than 100 nanometers.

7. The aspherical lens as claimed in claim 1, wherein a number of the steps defined along each section is more than two.

8. A lens comprising a first curved surface and an opposite second surface, wherein a step structure comprising a plurality of steps is repeated on the second surface, and a height of each step is less than 100 nanometers.

9. The lens as claimed in claim 8, wherein the steps are symmetrically formed with regard to a vertical center line of the step structure.

10. The lens as claimed in claim 8, wherein a number of steps between two consecutive uppermost steps is an odd number.

11. An aspherical lens comprising a first aspherical surface and an opposite second surface, wherein a grating comprising a plurality of steps is defined in the second surface, and a height of each step is less than 100 nanometers.

12. The aspherical lens as claimed in claim 11, wherein the second surface is substantially flat.

13. The aspherical lens as claimed in claim 11, wherein the grating is formed by means of photolithography.

14. The aspherical lens as claimed in claim 11, wherein the grating has "n" sections of uniform length, and a plurality of the steps is defined along each section.

15. The aspherical lens as claimed in claim 14, wherein the steps defined along each section are symmetrical.

16. The aspherical lens as claimed in claim 11, wherein the steps have a same width.

17. The aspherical lens as claimed in claim 11, wherein the steps have a same height.

18. The aspherical lens as claimed in claim 14, wherein a number of the steps defined along each section is more than two.

\* \* \* \* \*